Dec. 1, 1970 W. BLEICKARDT 3,544,907

APPARATUS FOR GENERATING SYNCHRONISED TIMING PULSES
IN A RECEIVER OF BINARY DATA SIGNALS

Filed June 8, 1967

Inventor:
WERNER BLEICKARDT

BY Rupert J. Brady

ATTORNEY

United States Patent Office 3,544,907
Patented Dec. 1, 1970

3,544,907

APPARATUS FOR GENERATING SYNCHRONISED TIMING PULSES IN A RECEIVER OF BINARY DATA SIGNALS

Werner Bleickardt, Redbank, N.J., assignor to Hasler A.G., Bern, Switzerland, a Swiss company Filed June 8, 1967, Ser. No. 644,616
Claims priority, application Switzerland, June 8, 1966, 8,244/66
Int. Cl. H03k *5/13, 1/00*
U.S. Cl. 328—63 2 Claims

ABSTRACT OF THE DISCLOSURE

Apparatus for generating synchronised timing pulses in a receiver of a binary data wave having transitions between individual data bits occurring at a synchronous data bit rate has a flip-flop which is in each case set by the output signal of a first gate circuit and is reset at the end of the transition pulse, and a connection between the output of the flip-flop and an additional input of a second gate circuit by means of which a second gate circuit is blocked while the flip-flop is set.

Figure 1:
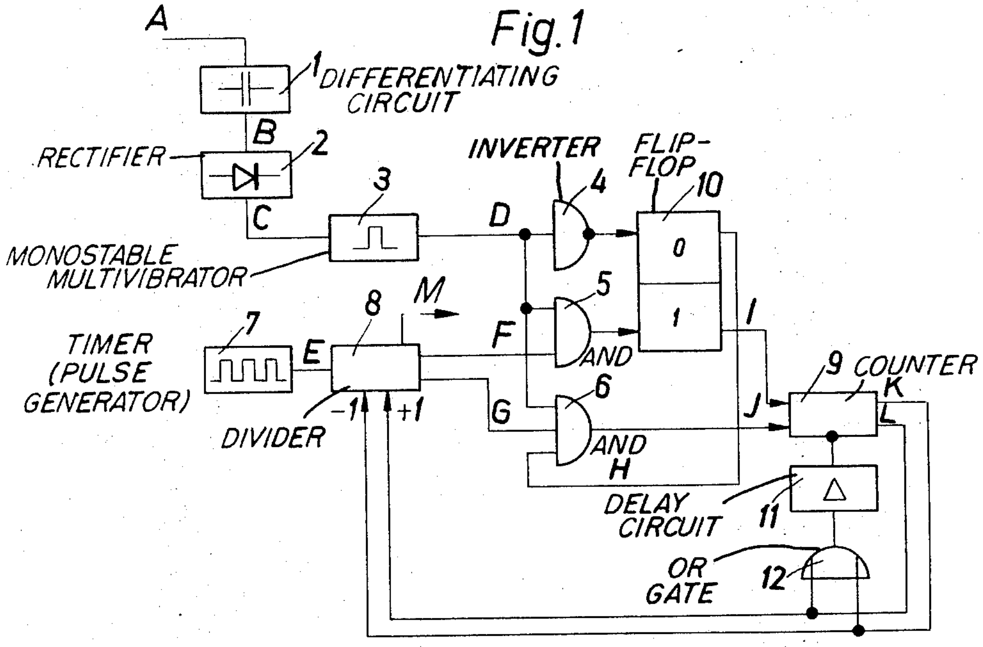

The invention relates to apparatus for generating synchronised timing pulses in a receiver of a synchronous digital communication system. Synchronous systems provide for a uniform speed of a digital transmission so that no more time is taken for one bit than any other. Bit times are at equal length and follow each other successively. Such a receiver requires clock pulses whose frequency is equal to the bit frequency of the received pulses and is in the correct phase relating thereto.

Apparatus is known containing a circuit which generates transition pulses from the changeover times of the received binary data wave having transitions between individual data bits occurring at a synchronous data bit rate, also a pulse generator operating at approximately n-times the bit frequency and a divider-by-n with adjustable lead and lag, generating during each bit period at least one clock pulse as well as a first and a second monitoring pulse, the interval between first and second monitoring pulses being shorter and the interval between second and first monitoring pulses being longer than the transition pulse.

Known apparatus furthermore contains a first AND gate circuit to whose inputs the first monitoring pulses and the transition pulses are applied and whose output signals induce a lag of the divider, also a second AND gate circuit to whose inputs the second monitoring pulses and the transition pulses are applied and whose output signals induce a lead of the divider. An example of such a divider is disclosed in the Swiss patent specification 374,101, and a further example is disclosed in the periodical "Electronics," Sept. 1, 1957, p. 153.

If such apparatus functions correctly it is possible for the phase error, that is to say, the deviation of the generated timing or clock pulses from ideal timing or clock pulses whose phase and frequency is determined by the received signals, to be maintained within predetermined limits. However, according to experience, such apparatus is subject to difficulties if the phase error amounts to 180° since an unstable condition will then arise which may in some circumstances be maintained for prolonged periods. Correct reception is not possible with such a phase error.

Various proposals have been made for remedying this difficulty, all involving complex supplementary apparatus. Accordingly, it is an object of the present invention to provide novel and improved apparatus for generating synchronised timing pulses in a receiver of a binary data wave having transitions between individual data bits occurring at a synchronous data bit rate, which apparatus overcomes the aforesaid difficulty and is simpler than apparatus hitherto known.

According to the present invention, a flip-flop is driven by output signal of the first gate circuit and is reset at the end of the transition pulse, and a connection is provided from the output of the flip-flop to an additional input of the second gate circuit by means of which the second gate circuit is blocked for as long as the flip-flop is set.

Also according to the present invention a counter is indexed in one direction from a central position by an output signal of the first gate circuit and is indexed by one bit in the other direction by an output signal of the second gate circuit, means are provided for correcting the divider position by one generator bit in the reverse direction on reaching a predetermined position of the counter and correcting the divider by one generator bit in the forward direction on reaching another predetermined position of the counter while at the same time the said counter is reset into the middle position.

Figure 2:
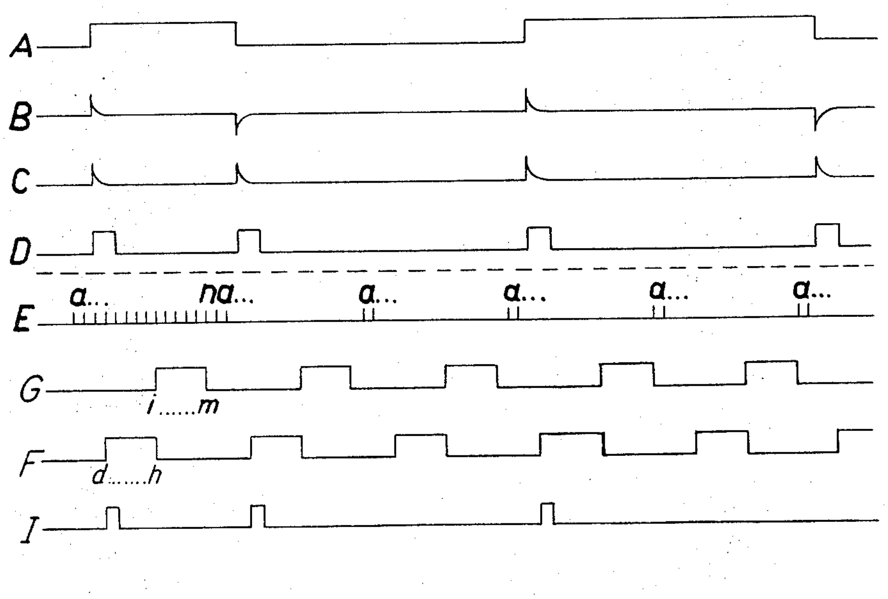

Further objects, features and advantages of the present invention will be clear to those skilled in the art from the following description thereof, given by way of example, in conjunction with the accompanying drawing, in which:

FIG. 1 is a block circuit diagram of apparatus according to the invention; and FIG. 2 shows the potentials relative to time which occur at various points of the apparatus of FIG. 1.

In FIG. 1 the numeral 1 refers to a differentiating circuit which differentiates and demodulates the binary data wave signal A received and appearing at its input and transfers it as signal B to the fullwave rectifying means 2. The output of 2 is connected to a monostable circuit 3 which forms from each received pulse C a square-wave pulse D of a certain length and transfers it to the inverter 4 and two AND gates 5 and 6. Thus pulses D are derived from the transitions between individual data bits of the received signal and therefore are referred to as transition pulses. The numeral 7 refers to a timer or clock pulse generator producing a continuous train of clock pulses E of approximately n-times the data bit rate and transferring said pulses to a divider-by-n 8. This divider-by-n produces for *n* clock pulses at least one timing pulse M and two monitoring pulses F and G. The clock pulses occurring during this period, which is called timing period, are lettered from *a* to *n*. During the timing periods *d* to *h* a first mounting pulse F will appear on a first output of the divider while during the timing periods *i* to *m* a second monitoring pulse G will appear at a second output, said first monitoring pulse F being transferred to an input of the AND gate 5 so that its output will have a signal I if the transition pulse D occurs during the timing periods *d* to $h$. The pulse G is applied to an input of the AND gate 6 at whose output a signal J may occur if the transition pulse D occurs during the timing periods $i$–$m$. This is possible only if at the same time a signal H appears at the third input of the said gate. The numeral 10 refers to a flip-flop capable of assuming two conditions designated with "0" and "1". The flip-flop 10 is set to "0" by a signal appearing at the output of the inverter 4 so that the flip-flop can be set to "1" only for the duration of a pulse transition. The flip-flop is set to "1" by a signal appearing at the output of the AND gate 5 and thus transfers a signal I to the computer 9. The aforementioned signal H is tapped off from the zero output of the flip-flop 10. A signal J obtained from the output of the AND gate 6 is applied to a second input of the counter 9. For each pulse I the said counter will count from a middle position one bit forward and for each pulse J it will count one bit in the reverse direction. As soon as the counter reaches its final position or any other predetermined position between the middle position and the final position it transmits a signal K which sets back the divider 8 by one bit. If the counter reaches the position "0"—or any other predetermined position between the middle position and the zero position—it will transmit a signal L to the divider which will advance the divider 8 in the forward direction by one bit. A K or L signal will also reset the counter 9 to the middle position with some delay. Resetting is controlled via the OR gate 12 and the delay circuit 11.

FIG. 2 illustrates voltage characteristics occurring in FIG. 1, namely the received and demodulated signal A, the signal B after differentiation, the signal C after rectification and the signal D at the output of the monostable circuit. A broken line indicates that the signals of the subsequent lines may be phase displaced against the preceding lines. The letter E indicates the timing pulses transmitted by the timer 7 and the timing periods labelled $a$ to $n$ within each bit period, while F and G illustrate the two monitoring pulses transmitted by the divider.

In the illustration the pulses G adjoin the pulses E. Pulses G and F are in a fixed phase relation to the output pulses M of the divider 8, and pulses D delivered by the monostable multivibrator 3 are in a fixed phase relation to signal pulses A. Pulses G and F are of use for checking the phase relation between pulses A and M by comparing the position of pulse D relative to pulses G and F. The phase relation is correct if each pulse D is situated within the spacing between a pulse G and a pulse F. The divider 8 leads if each pulse D coincides at least partially with a pulse F, and the divider 8 lags if each pulse D coincides at least partially with a pulse G. The divider is out of phase about a half period of the bit frequency if each pulse D coincides with a pulse G and with a pulse F. This is not essential; it is sufficient if the interval between F and G is smaller than the width of the transition pulses. The width of these in turn must be smaller than the interval between G and F.

In FIG. 2 the phase of the transition pulse and of the timing or clock generator pulse is so illustrated that part of the pulses D coincide with part of the pulses F. Accordingly, the pulses designated with I will appear at the output of the AND gate 5 and at the "I" side of the flip-flop 10 to indicate that the timing generator leads with respect to the transition pulse. The said pulses cause the counter 9 to count in the forward direction until its final position is reached and the counter transmits a signal K which resets the divider by one bit. If this is not sufficient, the divider is reset by a further bit in the reverse direction after a series of further I pulses until the transition pulse D occurs in the interval between the monitoring pulses G and F, that is to say when it occurs during the timing periods $m$–$d$. When this condition is reached no I and J will occur and the counter remains at rest. Coincidence between pulses D and G indicates that the timing generator lags.

In this case a pulse J appears on the output of the AND gate 6. This pulse indexes the counter backward by one bit. If the counter reaches its zero position the divider will be indexed forward through one timing bit by the pulse L until no coincidence occurs between G and D. If the pulse D coincides with the timing periods $m$–$d$ in the interval between pulses G and F, no I and J pulses will occur and the counter remains at rest.

If the transition pulse is symmetrically distorted owing to early appearance of the signal A and late disappearance thereof, the counter will alternately index one bit forward and one bit in the reverse direction so that the distortions are compensated and correct phase setting to the centre of the signal is obtained.

If the flip-flop 10 were not present and the output of the AND gate 5 were to be directly connected to the input of the counter this would result in phase instability under conditions of a 180° phase error, if the D pulse were so positioned as to coincide with the F and G pulses. Under these conditions I and J pulses would occur successively and index the counter one bit in the forward direction and one bit in the reverse direction so that said counter would mark time and could not induce phase displacement. The insertion of the flip-flop 10 causes the pulse appearing at the output of the AND gate 5 to be stored to the end of the transition pulse D; the connection extending from the output of the "0" side of the flip-flop 10 to an input of the AND gate 6 blocks the said gate during the time in which the flip-flop is set to position 1 so that no pulse appears although D and G coincide. Coincidence of D with F and with G allows only first to become effective thus delaying the operation of the divider until the D pulse occurs in the interval between the G and F pulses.

I claim:

1. Apparatus for generating synchronised timing pulses in a receiver of a binary data wave having transitions between individual data bits occurring at a synchronous data bit rate comprising: means for generating a train of pulses derived from the wave transitions in said data wave, a pulse generator for generating a continuous clock pulse train of approximately n-times said synchronous data bit rate, a divider-by-n with adjustable lead and lag connected to the output of said clock pulse generator and generating timing pulses as well as generating a first and a second monitoring pulse during each bit period of said data bit rate, the interval between said first and second monitoring pulses being shorter and the interval between said second and first monitoring pulses being longer than the said pulses derived from the wave transitions, a first AND gate circuit having inputs to which said first monitoring pulses and said pulses derived from the wave transitions are applied and having an output that is connected to induce lag of said divider, a second AND gate circuit having inputs to which said second monitoring pulses and said pulses derived from the wave transitions are applied and having a output that is connected to induce lead of said divider, said second AND gate circuit having an additional input, a flip-flop which is in each case connected to be set by the output of said first AND gate circuit and is connected to be reset at the end of said pulses derived from the wave transitions, flip-flop having an output, and a connection between the output of said flip-flop and said additional input of said second AND gate circuit by means of which said second AND gate circuit is blocked while said flip-flop is set.

2. Apparatus as set forth in claim 3, including a counter which is indexed through one bit in one direction from a middle position by the output of said first AND gate circuit and one bit in the other direction by the output of said second AND gate circuit, and means for correcting the divider position by one period of said continuous clock pulse train in the reverse direction when said counter reaches a predetermined position and for effecting correction of said divider by one period of said continuous clock pulse in the forward direction when said counter reaches another predetermined position while at the same time said counter is reset into the middle position.

References Cited

UNITED STATES PATENTS

| | | | |
|---|---|---|---|
| 3,141,930 | 7/1964 | Krauss | 178—69.5 |
| 3,160,821 | 12/1964 | Farrow | 328—155 |
| 3,185,963 | 5/1965 | Peterson et al. | 328—44UX |
| 3,209,265 | 9/1965 | Baker et al. | 328—63 |
| 3,363,183 | 1/1968 | Bowling et al. | 328—72UX |
| 3,388,216 | 6/1968 | Brooke et al. | 328—72UX |

JOHN S. HEYMAN, Primary Examiner

J. ZAZWORSKY, Assistant Examiner

U.S. Cl. X.R.

307—269; 328—72, 155